United States Patent [19]

Amplatz

[11] Patent Number: 4,726,772

[45] Date of Patent: Feb. 23, 1988

[54] MEDICAL SIMULATOR

[76] Inventor: Kurt Amplatz, 10 Evergreen Rd., St. Paul, Minn. 55110

[21] Appl. No.: 936,331

[22] Filed: Dec. 1, 1986

[51] Int. Cl.$^4$ ............................................. G09B 23/30
[52] U.S. Cl. .................................................... 434/272
[58] Field of Search ................................ 434/272, 267

[56] References Cited

U.S. PATENT DOCUMENTS

| | | | |
|---|---|---|---|
| 3,376,659 | 4/1968 | Asin et al. | 434/272 |
| 3,579,858 | 5/1971 | Bentov | 434/272 |
| 4,332,569 | 6/1982 | Burbank | 434/272 |
| 4,459,113 | 7/1984 | Boscarogatti et al. | 434/272 |

Primary Examiner—William H. Grieb

[57] ABSTRACT

A medical simulator for enabling demonstration, trial and test of insertion of torqueable elongated members into small body passages that branch from main passages is disclosed. Such torqueable members may be guide wires or catheters which are constructed to cause the distal tip to turn or twist in response to a corresponding motion applied by the operator to a proximal portion of the device.

14 Claims, 8 Drawing Figures

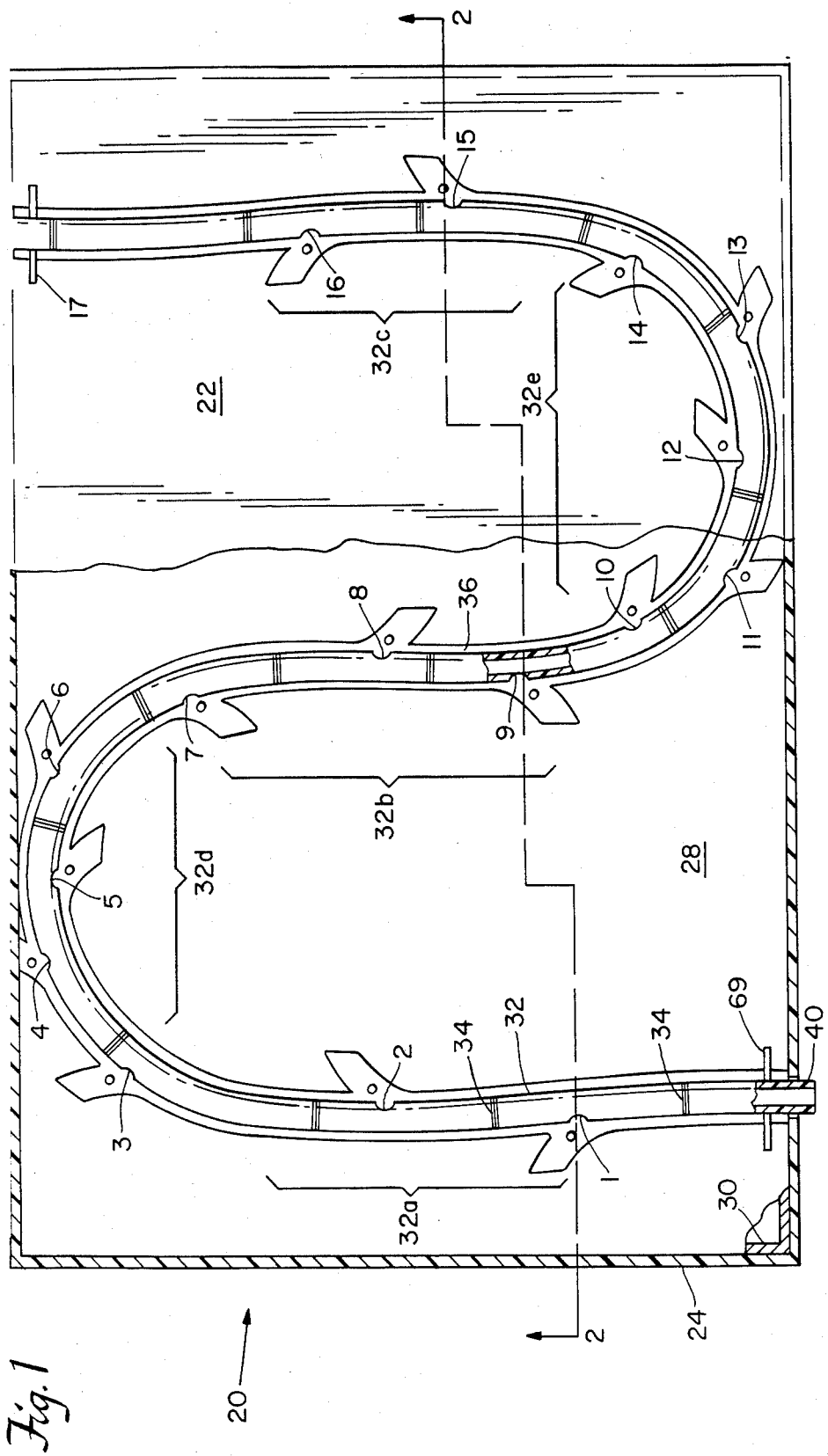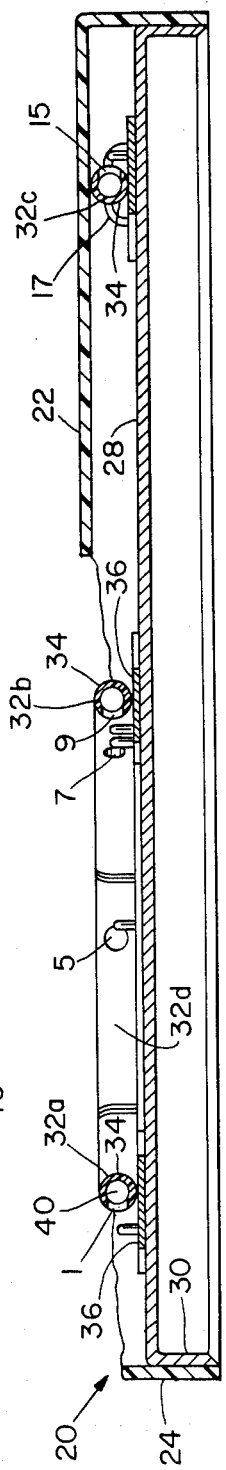

MEDICAL SIMULATOR

This invention relates to a medical simulator for enabling demonstration, trial and test of insertion of torqueable elongated members into small body passages that branch from main passages. Such torqueable members may be guide wires or catheters which are constructed to cause the distal tip to turn or twist in response to a corresponding motion applied by the operator to a proximal portion of the device.

BACKGROUND

Anatomical models, such as shown in U.S. Pat. No. 3,579,858, seek to be close replicas of passages of the human body.

SUMMARY OF THE INVENTION

It is realized that a greatly simplified approach using simple tubing and an arbitrary lumen pattern, not closely replicative of any particular body passage, leads to many desirable advantages.

The simulator can be low cost, compact easy to transport, and still provide a fair, even rigorous, operational test of the capabilities of torqueable guide wire and catheter products being offered and of the skills of the physician who intends to use such products.

In one aspect the invention features a medical simulator comprising an extended support surface, a length of hollow tubing extending in a curved pattern along and secured to the support surface in a manner to simulate a main lumen, indicia along the length of the tubing providing a visual suggestion of a series of branch lumens joined to the main lumen at a variety of positions, apertures in the wall of the tubing corresponding to the indicated branch lumens, the tubing having at least one open end and sized to enable insertion and passage of a torqueable elongated member and the apertures sized to permit entry of the distal tip of the elongated member, the tubing having a light-transmissive wall through which the operator can observe the progress of the torqueable member, whereby the operator can maneuver the torqueable member to pass along the pattern of the tubing and into the apertures thereby to simulate fluoroscopically-controlled entry into a branch lumen of the body at selected places along a main lumen.

Preferred embodiments include the following features. The apertures are positioned on the inside and outside of curved portions of the tubing and on straight portions preceding and following a curved portion of the tubing. A sequence of curves in different directions are provided along the length of the tubing. The tubing is sized for passage of a torqueable guide wire. The tubing is sized for passage of a torqueable catheter. The tubing is comprised of clear plastic. The indicia comprise a representation, in a color contrasting with that of the support, of a main lumen and of branch lumens joined thereto.

Certain preferred embodiments include responsive devices located at the apertures for automatically informing the operator of successful entry and responsive devices conjoined with a timing mechanism that enables an operator to determine his skill and speed in successfully negotiating the simulator.

Certain other embodiments comprise three-dimensional arrays formed either of a flexible continuous length of tubing or of straight segments joined in a succession of branches Christmas-tree like.

In the Drawings:

FIG. 1 is a plan view of the medical simulator of the invention, while FIG. 2 is a longitudinal sectional view, FIG. 3 a transverse cross sectional view, and FIG. 4 a perspective view of the embodiment;

Figure 4:
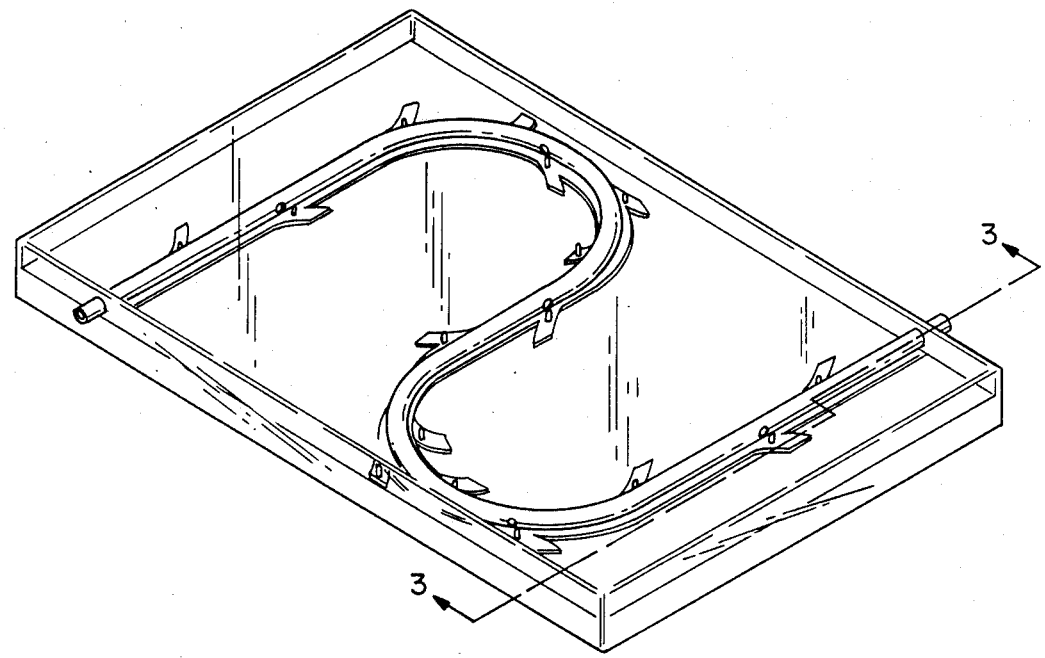

Referring to FIG. 1-4, in a presently preferred embodiment, a main support frame 20 is comprised of rigid clear plastic and defines transparent top face 22 and side frame members 24 and 26. An opaque planar support member 28 is held within the side frame members 24 and 26 at a spaced position below the top face 22 by support legs 30 which are joined to the side frame members of the main support frame, e.g. by adhesive or friction fit. In the space between top face 22 and support member 28, a segment of clear plastic, flexible tubing 32 of constant diameter is disposed in a curved pattern, as shown, to simulate in an arbitrary manner a tortuous lumen of the human body. This pattern includes straight portions 32a, 32b and 32c and curved portions 32d and 32e, the latter of U-form, in opposite directions.

A series of apertures 1-16 is provided in the wall of the tubing, each having an axis generally parallel to the support member 28. The apertures are positioned to represent the variety of positions of branch lumens that may be found in the body, including apertures in straight portions preceding and following a first curve, and a second curve in a different direction, and apertures at the curves on both the inside (convex) and outside (concave) walls. The tubing 32 is secured at spaced-apart points by U-shaped fasteners 34 that hold the tubing securely to the support member 28 without occluding the lumen of the tubing. The overall surface of the support member viewed through the clear plastic face 22 is provided with a desirable background color. Interposed upon the support member 28 beneath and extending beyond the outline of the tubing, is a visual indicia 36, in a color which contrasts with the overall surface of member 28, giving a suggestion of the stubs 31 of branch lumens as they leave from a main lumen of the body. In the example shown the support member 18 is blue, the indicia 36, is red, and the tubing as mentioned before is clear, permitting the red indicia lying underneath the tubing to be seen by the operator.

Figure 5:
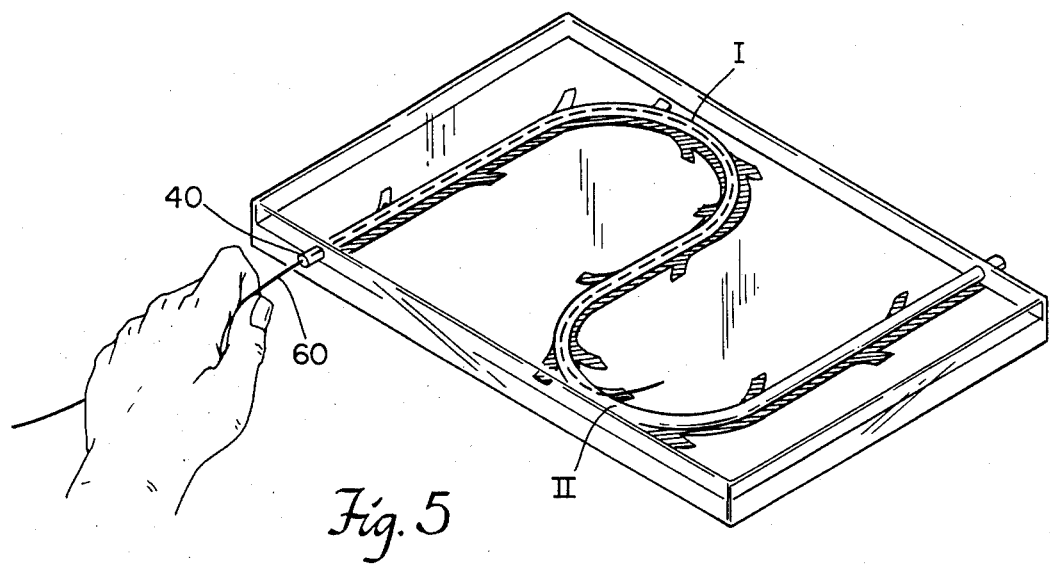
FIG. 5 is a diagrammatic perspective view showing the insertion of a guide wire through an aperture following negotiation of a tortuous portion of the simulated lumen.

Referring to FIG. 5, an operator grasps a proximal end of a guide wire 60 and inserts it into the entry 40 of the tubing and, while observing the wire visually through the clear tubing, selectively torques the guide wire to cause it to twist, and depending upon his skill, to enter a selected aperture. In the example shown, the operator has successfully maneuvered the torqueable guide wire along straight section 32a, through the first U-form curve, along the straight section 32b to the aperture lying on the inside of the second U-curve.

Figure 6:
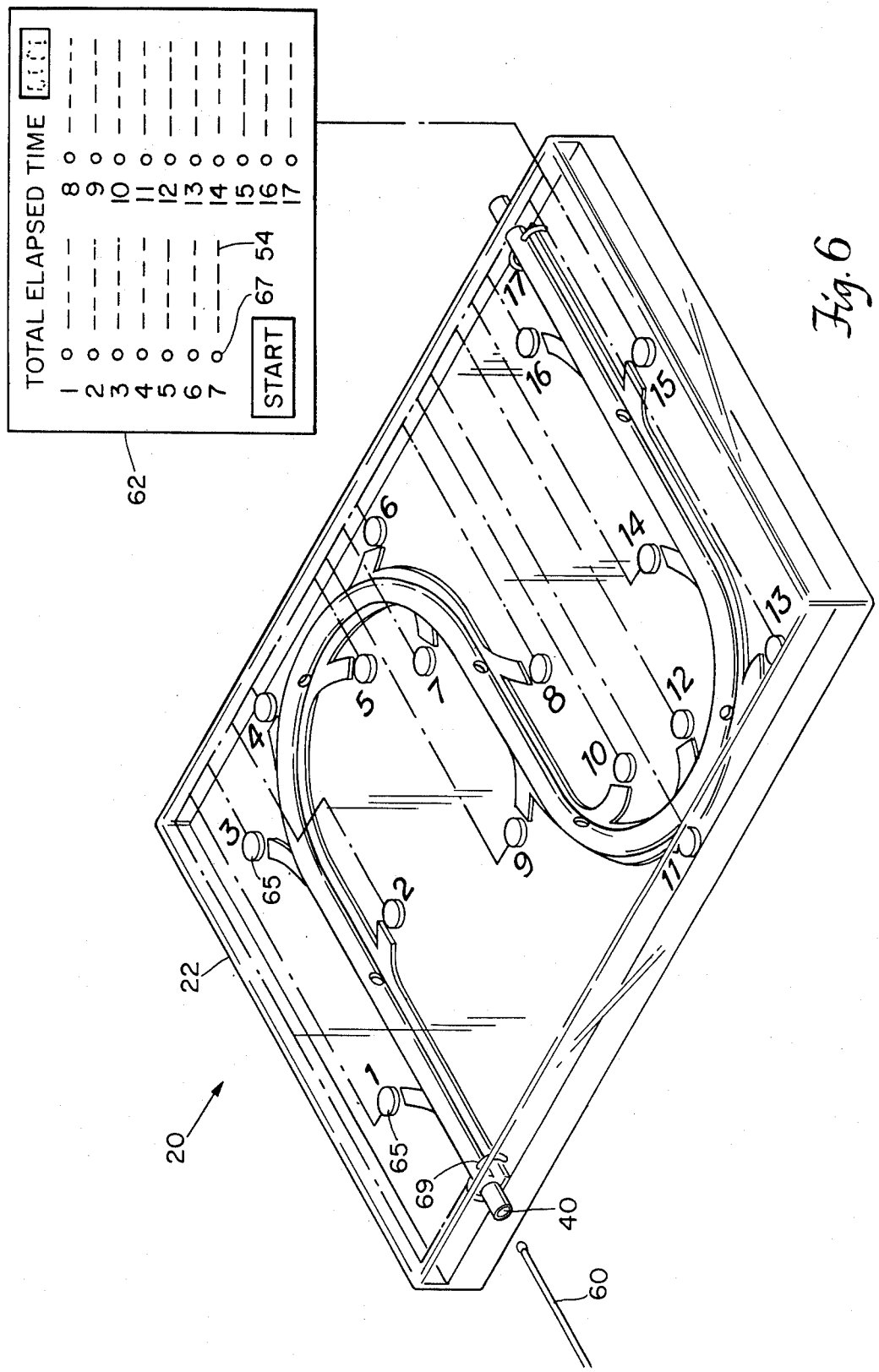
FIG. 6 is a similar perspective view of the simulator having added features enabling a game of skill to be played using the simulator principles.

Referring to FIG. 6, pressure sensitive devices 65 are located adjacent each of the apertures and arranged to respond to pressure applied by the guide wire to energize a corresponding recording light 67 on the display panel 62. A fiber optic, photocell arrangement 69 at the entry of the simulator controls the on/off status of the display and another such device 17 at the end of the tubing can sense when the guide wire or other probe has reached the end. An elapsed time indicator is arranged to compute the time of contact with each of the responsive devices from the time of contact with the preceding device and to record the differential in time in the appropriate spot in the time display 54. Total elapsed time from the beginning is also recorded. Thus, as an operator negotiates the simulator, he is able to keep track of time elapsed from one position to the next and the total time elapsed to the end of successfully negotiating the simulator.

In an alternate use, he may time the negotiation of the simulator from start to any selected aperture.

The simulator is useful with other torqueable members, catheters, for instance, which incorporate a braided metal structure in the wall for enabling rotation of one end to cause the other end to turn.

The simulator is useful for physicians concerned with the human arterial system, the venal system, the bronchial tree and the biliary tree.

Figure 3:
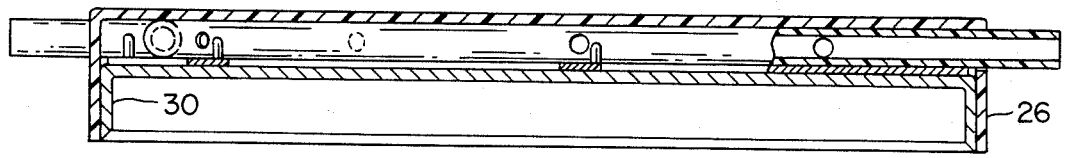
FIG. 3a is a side view similar to FIG. 3 of another embodiment.
Figure 3A:
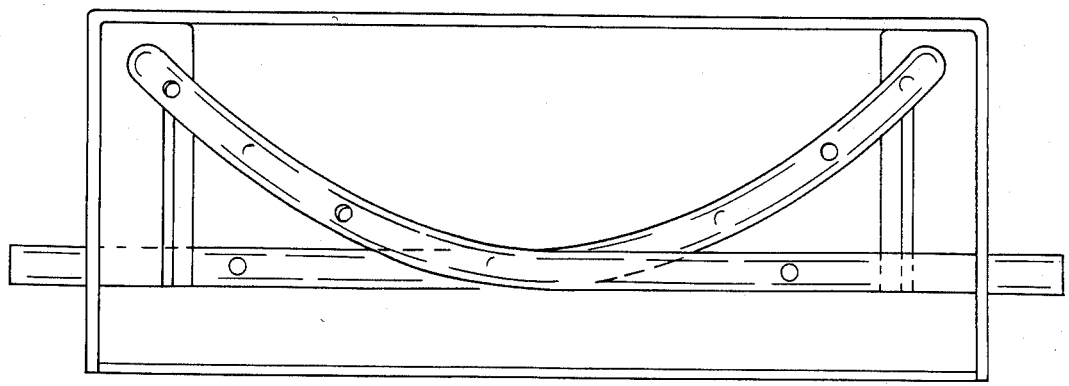

In the alternative embodiment of FIG. 3a, supports raised from the main support surface are provided in the regions of the curves, while the straight portions lie along the main support surface, thus providing a three-dimensional curved condition.

Figure 7:
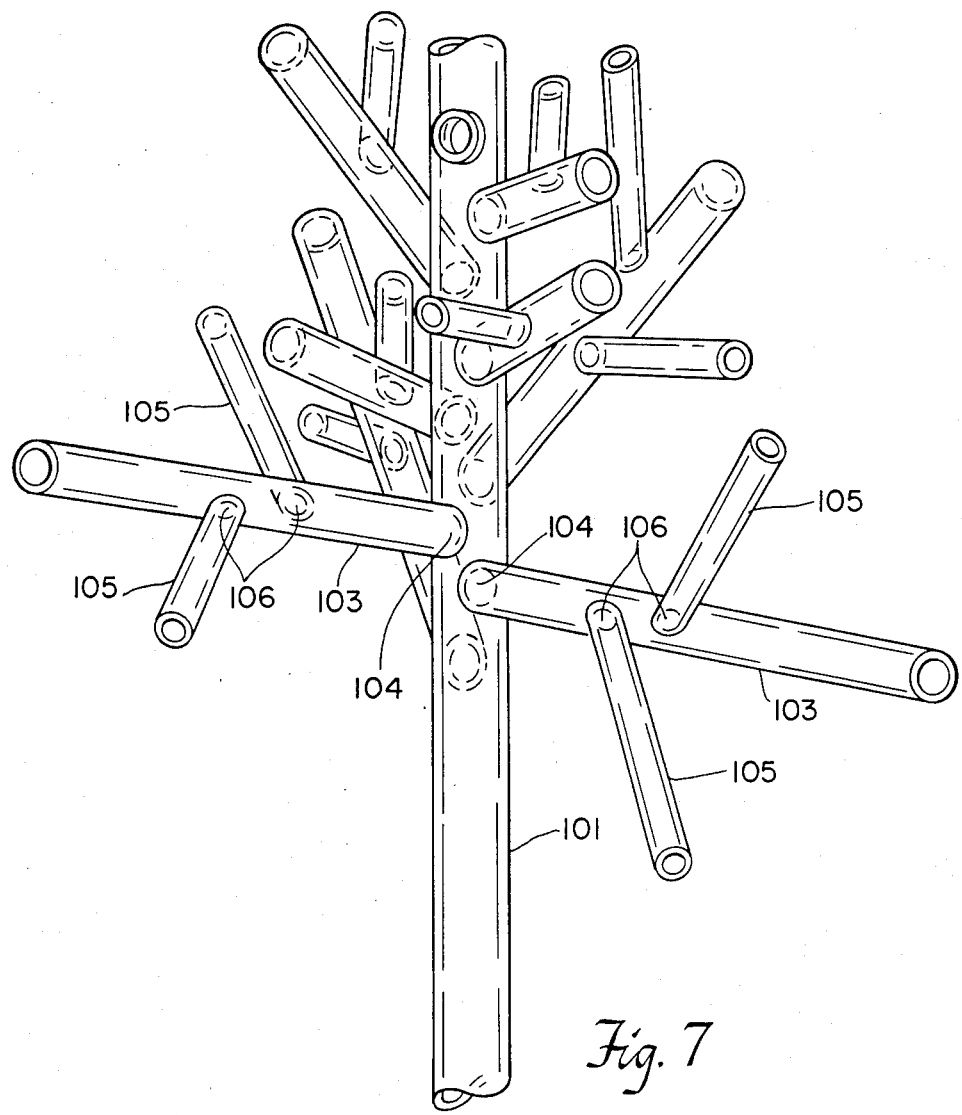
FIG. 7 is a perspective view of another embodiment.

In the alternative "Christmas-tree like" embodiment of FIG. 7, a straight constant diameter, rigid tubing section 101 defines the main lumen, further straight, constant diameter sections 103 are joined at apertures 104 of the main lumen to define first level branching and further straight, rigid, constant diameter sections 105 are joined at apertures 106 in the first level branches to define second level branching.

What is claimed is:

1. A medical simulator comprising:
   an extended support surface,
   a length of hollow tubing extending in a curved pattern along and secured to said support surface in a manner to simulate a main lumen of the body,
   indicia along the length of said tubing providing a visual suggestion of a series of branch lumens joined to said main lumen at a representative variety of positions,
   apertures in the wall of said tubing corresponding to said indicated branch lumens,
   said tubing having at least one open end and sized to enable insertion and passage of a torqueable elongated member and said apertures sized to permit entry of the distal tip of said elongated member,
   said tubing having a light-transmissive wall through which the operator can observe the progress of said torqueable member,
   whereby the operator can maneuver the torqueable member to pass along the curved pattern of said tubing and into said apertures thereby to simulate fluoroscopically-controlled entry into a branch lumen of the body at selected places along a main lumen.

2. The medical simulator of claim 1 wherein said apertures open into an unconfined space visible to the operator whereby when he sees the tip of the torqueable member emerge through the aperture into such space, knows that the aperture has been successfully entered.

3. The simulator of claim 1 or 2 wherein said apertures are positioned on the inside and outside of curved portions of said tubing and on straight portions preceding and following a curved portion of the tubing.

4. The simulator of claim 1 wherein said tubing is sized for passage of a torqueable guide wire.

5. The simulator of claim 1 wherein said tubing is sized for passage of a torqueable catheter.

6. The simulator of claim 1 wherein said tubing is comprised of clear plastic.

7. The simulator of claim 1 wherein said indicia comprise a representation, in a color contrasting with that of the support, of a main lumen of the body and of branch lumens joined thereto.

8. The simulator of claim 6 wherein said indicia are red and are suggestive of main and branch lumens of a blood vessel.

9. The simulator of claim 1 in which there are additional such tubings joined to said apertures to represent branch lumens, the walls of said branch tubings also having apertures to simulate further branching of the lumen system.

10. The simulator of claim 1 including responsive devices located at said apertures for automatically informing the operator of successful entry.

11. The simulator of claim 10 wherein said responsive devices are conjoined with a timing mechanism thereby to enable an operator to determine his skill and speed in successfully negotiating the simulator.

12. A medical simulator comprising:
    a straight length of hollow, rigid tubing to simulate a main lumen of the body,
    apertures in the wall of said tubing to which further straight lengths of hollow, rigid tubing are secured at a variety of angles to simulate first branch lumens,
    said tubing having at least one open end and sized to enable insertion and passage of a torqueable elongated member and said apertures sized to permit entry of the distal tip of said elongated member,
    said tubing having a light-transmissive wall through which the operator can observe the progress of said torqueable member,
    whereby the operator can maneuver the torqueable member to pass along the pattern of said tubing to simulate fluoroscopically-controlled entry into a branch lumen of the body at selected places along a main lumen.

13. The simulator of claim 12 wherein there are apertures in the wall of the first branch sections of tubings, to which further lengths of hollow, rigid tubing are secured at a variety of angles to simulate second branch lumens.

14. The simulator of claim 12 or 13 wherein said lengths of tubing are rigid, each being of constant diameter throughout its length.

* * * * *